US009804822B2

(12) United States Patent
Jung et al.

(10) Patent No.: US 9,804,822 B2
(45) Date of Patent: Oct. 31, 2017

(54) ELECTRONIC APPARATUS AND CONTROL METHOD THEREOF

(71) Applicant: SAMSUNG ELECTRONICS CO., LTD., Suwon-si (KR)

(72) Inventors: Chi-sang Jung, Seoul (KR); Byung-jin Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/698,126

(22) Filed: Apr. 28, 2015

(65) Prior Publication Data

US 2016/0035350 A1 Feb. 4, 2016

(30) Foreign Application Priority Data

Jul. 29, 2014 (KR) .................. 10-2014-0096342

(51) Int. Cl.
*G10L 25/00* (2013.01)
*G10L 25/27* (2013.01)
(Continued)

(52) U.S. Cl.
CPC .............. *G06F 3/167* (2013.01); *G10L 17/20* (2013.01); *G10L 15/00* (2013.01); *G10L 17/08* (2013.01)

(58) Field of Classification Search
CPC ....... G10L 17/02; G10L 15/26; G10L 21/028; G10L 15/22; G10L 17/00; G10L 21/0216; G10L 17/04; G10L 15/02; G10L 15/10; G10L 15/20

USPC ........ 704/245-247, 250, 231, 233, 235-236, 704/243, 275, 226, E17.006, E15.044; 379/88.01

See application file for complete search history.

(56) References Cited

U.S. PATENT DOCUMENTS

| 7,409,343 B2 | 8/2008 | Charlet |
| 2003/0036903 A1* | 2/2003 | Konopka ............. G10L 15/065 704/249 |

(Continued)

FOREIGN PATENT DOCUMENTS

| JP | 3859884 B2 | 12/2006 |
| JP | 2007-241304 A | 9/2007 |

(Continued)

*Primary Examiner* — Marivelisse Santiago Cordero
*Assistant Examiner* — Stephen Brinich
(74) *Attorney, Agent, or Firm* — Sughrue Mion, PLLC

(57) ABSTRACT

An electronic apparatus and a controlling methods thereof are disclosed. The electronic apparatus includes a voice input unit configured to receive a user voice, a storage unit configured to store a plurality of voice print feature models representing a plurality of user voices and a plurality of utterance environment models representing a plurality of environmental disturbances, a controller, in response to a user voice being input through the voice input unit, configured to extract utterance environment information of an utterance environment model among the plurality of utterance environment models corresponding to a location where the user voice is input, compare a voice print feature of the input user voice with the plurality of voice print feature models, revise a result of the comparison based on the extracted utterance environment information, and recognize a user corresponding to the input user voice based on the revised result.

13 Claims, 11 Drawing Sheets

(51) Int. Cl.
  *G06F 3/16* (2006.01)
  *G10L 17/20* (2013.01)
  *G10L 15/00* (2013.01)
  *G10L 17/08* (2013.01)

(56) References Cited

U.S. PATENT DOCUMENTS

| | | | |
|---|---|---|---|
| 2004/0111261 A1* | 6/2004 | Chaudhari | G10L 17/08 704/236 |
| 2006/0206332 A1* | 9/2006 | Paek | G10L 15/063 704/257 |
| 2008/0195389 A1* | 8/2008 | Zhang | G10L 17/24 704/246 |
| 2011/0202340 A1* | 8/2011 | Ariyaeeinia | G10L 17/20 704/233 |
| 2014/0088961 A1* | 3/2014 | Woodward | G10L 15/22 704/235 |

FOREIGN PATENT DOCUMENTS

| | | |
|---|---|---|
| JP | 2009-139894 A | 6/2009 |
| KR | 10-2004-0028790 A | 4/2004 |
| KR | 10-0776803 B1 | 11/2007 |
| KR | 10-2008-0026951 A | 3/2008 |
| KR | 10-2012-0077527 A | 7/2012 |

\* cited by examiner

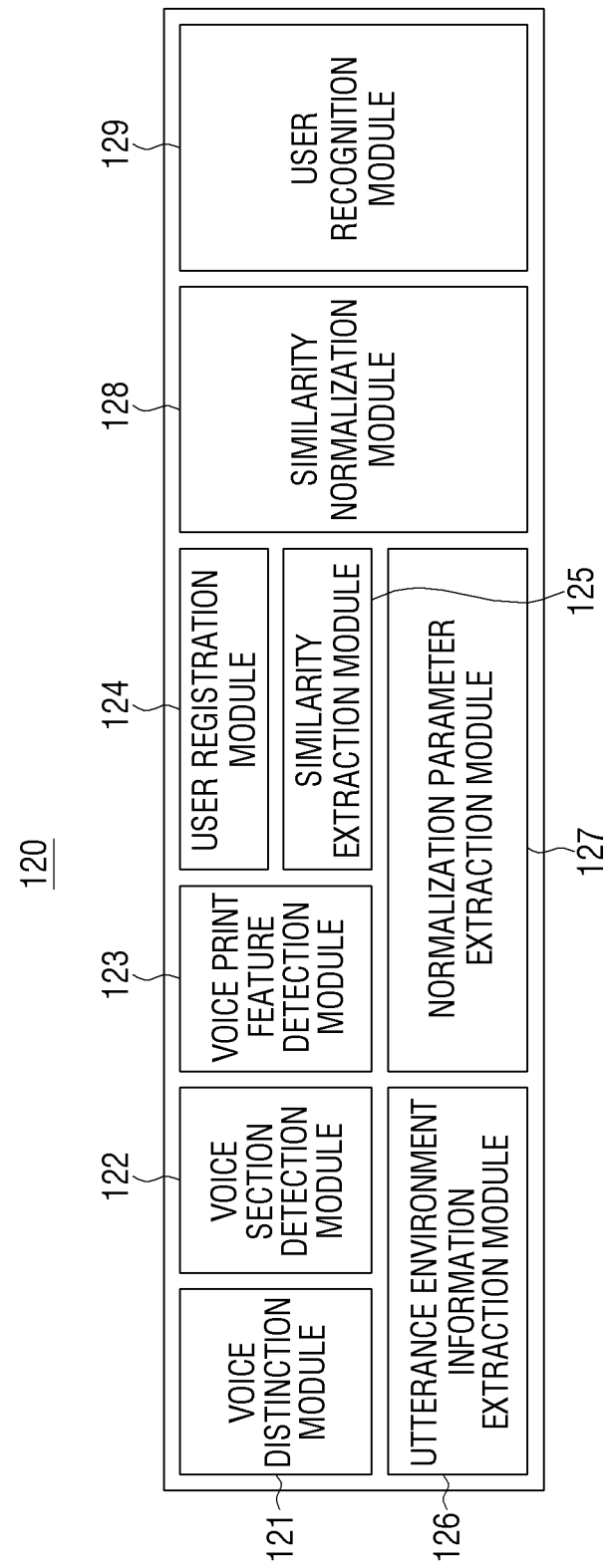

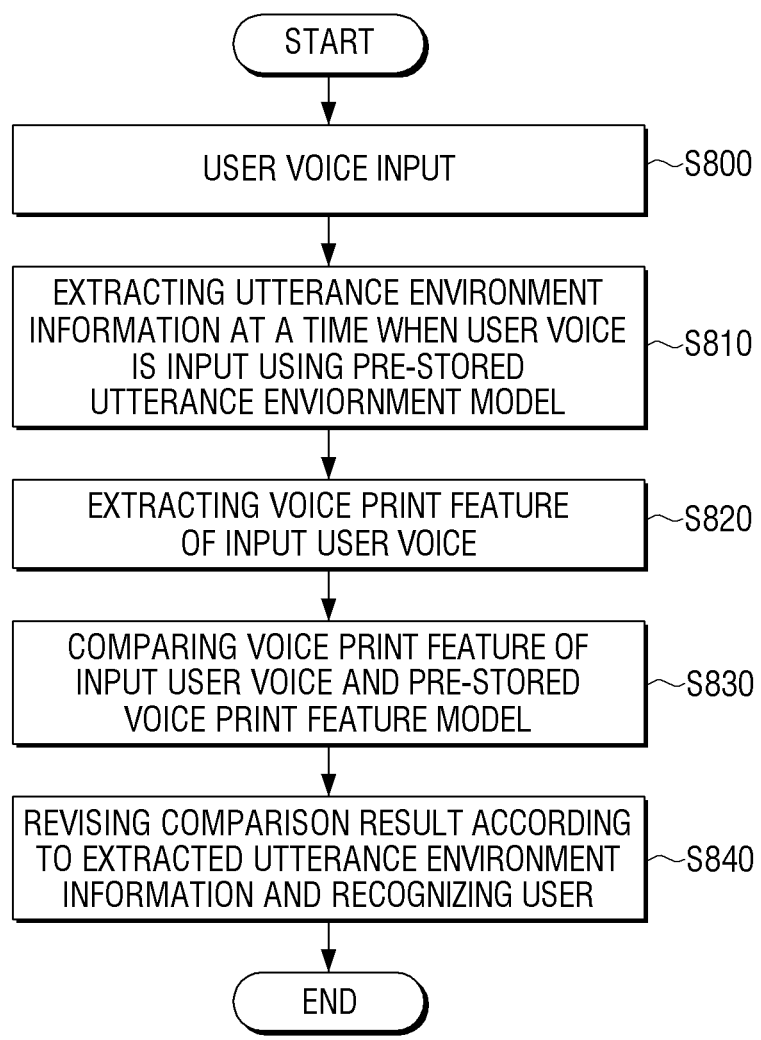

ELECTRONIC APPARATUS AND CONTROL METHOD THEREOF

CROSS-REFERENCE TO RELATED APPLICATION(S)

This application claims priority from Korean Patent Application No. 10-2014-0096342, filed on Jul. 29, 2014, in the Korean Intellectual Property Office, the disclosure of which is incorporated herein by reference in its entirety.

BACKGROUND

1. Field

Methods and apparatuses consistent with exemplary embodiments relate to an electronic apparatus, and more particularly, to an electronic apparatus capable of recognizing a user who utters a voice in the presence of surrounding noise and reverberation, and a method thereof.

2. Description of the Related Art

Recently, there has been an influx of electronic apparatuses equipped with a voice recognition function into the consumer market. A user may enter a voice recognition mode of an electronic apparatus by performing a user input. In many cases, an additional control apparatus, such as a remote controller, of an electronic apparatus is equipped with a user interface for entering the voice recognition mode of the electronic apparatus.

The voice recognition feature may provide not only a function of controlling an electronic apparatus, but also a function of recognizing a user who utters the voice and providing a menu that each user sets, a program that each user likes, etc. Specifically, an electronic apparatus may recognize a user who utters a voice using a voice print, which is a graph acquired as a result of a time sequential decomposition of a frequency distribution of a voice.

A place where an electronic apparatus is used is different based on the user. A reverberation of an uttered user voice may be different according to the surroundings of the place where the electronic apparatus is being used. Also, the background noise accompanying the uttered user voice may differ based on the time and or place.

To recognize a user who utters a voice, a voice print needs to be detected by analyzing the user's voice. Accordingly, an accurate analysis result of the user's voice is needed. However, as described above, a user recognition result may be different or impossible according to the surroundings of a place where an electronic apparatus is used or the background noise accompanying an utterance.

Accordingly, a technology capable of easily and accurately recognizing a user who uses a voice recognition function, even if a noise or an unnecessary or unintended sound which is generated by the noise or the reverberation exists in a place where an electronic apparatus is used, is required.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an electronic apparatus that includes a voice input unit configured to receive a user voice, a storage unit configured to store a plurality of voice print feature models representing a plurality of user voices and a plurality of utterance environment models representing a plurality of environmental disturbances, a controller, in response to a user voice being input through the voice input unit, configured to, extract utterance environment information of an utterance environment model among the plurality of utterance environment models corresponding to a location where the user voice is input, compare a voice print feature of the input user voice with the plurality of voice print feature models, revise a result of the comparison based on the extracted utterance environment information, and recognize a user corresponding to the input user voice based on the revised result.

The controller may further measure a similarity between at least one of a plurality of voice print features stored in the voice print feature models stored in the storage unit and the voice print feature of the input user voice, revise the measured similarity based on the extracted utterance environment information, and recognize the user corresponding to the input user voice based on the revised similarity.

The controller may further extract a normalization parameter comprising utterance environment information corresponding to the location where the user voice is input, from the stored utterance environment model, normalize the similarity using the normalization parameter, and recognize the user corresponding to the input user voice based on the normalized similarity.

The utterance environment model may include at least one of a noise corresponding to a space where the user voice is uttered and information regarding a reverberation.

The controller may further analyze the utterance environment information after a predetermined time period and update the utterance environment model.

The controller may further, in response to the user voice being input for user registration, analyze the input user voice, extract the voice print feature corresponding to the input user voice, revise the extracted voice print feature based on the extracted utterance environment information, and perform the user registration based on the revised voice print feature.

The controller may further, in response to the user being recognized, change an execution mode of the electronic apparatus to a predetermined voice recognition mode based on the recognized user.

According to another aspect of an exemplary embodiment, there is provided a method of controlling an electronic apparatus that includes receiving a user voice input, and in response to the user voice being input, extracting utterance environment information of an utterance environment model among a plurality of utterance environment models corresponding to a location where the user voice is input, extracting a voice print feature of the input user voice, comparing the voice print feature of the input user voice with a plurality of voice print feature models representing a plurality of user voices, revising a result of the comparison according to the extracted utterance environment information, and recognizing a user corresponding to the input user voice based on the revised result.

The comparing may further include measuring a similarity between at least one of a plurality of voice print features stored in the voice print feature models stored in a storage unit and the voice print feature of the input user voice, revising the measured similarity based on the extracted utterance environment information, and recognizing the user corresponding to the input user voice based on the revised similarity.

The comparing may further include extracting a normalization parameter comprising utterance environment information corresponding to the location where the user voice is input, from the stored utterance environment model, normalizing the similarity using the normalization parameter, and recognizing the user corresponding to the input user voice based on the normalized similarity.

The utterance environment model may include at least one of a noise corresponding to a space where the user voice is uttered and information regarding a reverberation.

The method may further include analyzing the utterance environment information after a predetermined time period and updating the utterance environment model.

The method may further include in response to the user voice being input for user registration, analyzing the input user voice, extracting the voice print feature corresponding to the input user voice, revising the extracted voice print feature based on the extracted utterance environment information, and performing the user registration based on the revised voice print feature.

The method may further include in response to the user being recognized, changing an execution mode of the electronic apparatus to a predetermined voice recognition mode based on the recognized user.

According to an aspect of another exemplary embodiment, there is provided an electronic apparatus that includes a microphone configured to receive a user voice, a processor configured to extract a voice print feature corresponding to the user voice, extract surrounding noise information incorporated in the received user voice using a surrounding noise information model stored in a storage unit, compare the voice print feature with a plurality of voice print features pre-stored in the storage unit representing a plurality of user voice inputs from a plurality of users, revise a result of the comparison based on the extracted surrounding noise information, recognize a user corresponding to the input user voice based on the revised result.

According to various exemplary embodiments, the user is able to use an electronic apparatus recognizing a user in an environment where a reverberation or a noise of a place where the user utters a voice exists.

BRIEF DESCRIPTION OF THE DRAWINGS

The above and/or other aspects will be more apparent by describing certain exemplary embodiments with reference to the accompanying drawings, in which:

FIG. 3 is a block diagram illustrating a configuration of a storage unit of the electronic apparatus according to an exemplary embodiment;

FIG. 8 is a flowchart describing a control method of performing voice recognition using an electronic apparatus according to an exemplary embodiment.

DETAILED DESCRIPTION OF THE EXEMPLARY EMBODIMENTS

Figure 1:
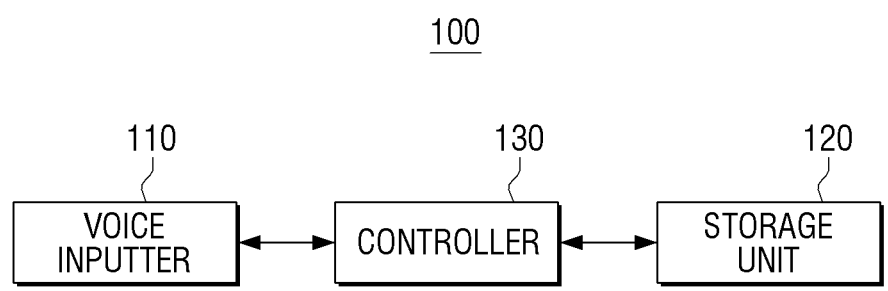
FIG. 1 is a block diagram illustrating a configuration of an electronic apparatus according to an exemplary embodiment.

Hereinafter, exemplary embodiments will be described in greater detail with reference to the accompanying drawings. In the following description, functions or elements known in the related art are not described in detail because they would obscure the exemplary embodiments with unnecessary detail. Also, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters.

FIG. 1 is a block diagram illustrating a configuration of an electronic apparatus 100 according to an exemplary embodiment. As illustrated in FIG. 1, the electronic apparatus 100 may include a voice inputter 110, a storage unit 120 and a controller 130. The electronic apparatus 100 may be realized as a television (TV), but is not limited thereto. The electronic apparatus 100 may be realized as various apparatuses such as a cell phone, a tablet personal computer (PC), a digital camera, a camcorder, a notebook computer, a home theater including a voice recognition function and the like.

The voice inputter 110 is used for inputting a user voice. The voice inputter 110 may include a microphone, and a user voice may be input through the microphone. Also, the microphone may be included in an external apparatus such as a remote controller to control the electronic apparatus 100, according to an exemplary embodiment. The remote controller may receive a user voice through the microphone and transmit the received user voice to the voice inputter 110.

The storage unit 120 may store various kinds of information, such as a voice print feature model and an utterance environment model. A voice print is a graph acquired as a result of a time sequential decomposition of a frequency distribution of a voice, and differs depending on the user. Thus, the storage unit 120 may store a voice print feature model which incorporates information regarding a voice print feature acquired by analyzing a voice of each user. If there are a plurality of users using a voice recognition function of the electronic apparatus 100, the storage unit 120 may store a voice print belonging to each of the plurality of users.

An utterance environment model may include various kinds of information regarding an environment where a user voice is uttered. In other words, the utterance environment may include noise from the surroundings of the place where a user voice is uttered or sounds created because of reverberation. For example, surrounding noise, of the place where the electronic apparatus 100 is located, input through the voice inputter 110 is detected and analyzed, and the resulting frequency response of the noise may be stored in the storage 120 as an utterance environment model.

Information regarding a sound input into the electronic apparatus 100, a reverberation and the like, may be pre-analyzed, and the utterance environment model may be stored in the electronic apparatus 100, as a default value.

Also, the electronic apparatus 100 may collect the utterance environmental information and update an utterance environment model each time sound is input. According to another exemplary embodiment, the electronic apparatus 100 may update the utterance environment model after a predetermined period of time. A method of updating the utterance environment model will be explained in detail later.

The storage unit 120 may be divided into a storage unit for storing a voice print feature model and a storage unit for storing an utterance environment model.

As described above, storing a voice print feature model and an utterance environment model in the storage unit 120 is one of exemplary embodiments, and at least one of the voice print feature model and the utterance environment model may be stored in an external server or an external storage apparatus.

The controller 130 controls an overall operation of the electronic apparatus 100, according to an exemplary embodiment. Specifically, the controller 130 may analyze a user voice input through the voice inputter 110, and extract a voice print feature. The controller 130 may then compare the extracted voice print feature with the voice print feature model stored in the storage unit 120 and recognize a user who uttered the voice.

If an input user voice is distorted by a background noise or a reverberation, the controller 130 may extract utterance environment information of a time when a user voice is input, and revise a comparison result of an extracted voice print feature and the pre-stored voice print feature model according to the extracted utterance environment information so that a user may be recognized.

Specifically, the controller 130 may compare a voice print feature of an input user voice and a voice print feature model stored in the storage 120, and measure a similarity regarding a voice print feature model of each of a plurality of users stored in the storage unit 120. Also, the controller 130 may revise a measured similarity based on the extracted utterance environment information and recognize a user corresponding to the revised similarity.

The controller 130 may extract a normalization parameter, which is utterance environment information according to a time when a user voice is input from a stored utterance environment model. Also, the controller 130 may normalize a similarity using the extracted normalization parameter and recognize a user.

If a user who utters a user voice is recognized by the method described above, the controller 130 may change an execution mode of the electronic apparatus 100 to a predetermined voice recognition mode according to the recognized user.

The controller 130 may use an utterance environment model when a user registration is performed using a user voice. Specifically, if a user voice for a user registration is input through the voice inputter 110, the controller 130 may analyze an input user voice, detect a voice print feature, revise a detected voice print feature according to utterance environment information stored in the storage 120, and perform user registration according to the revised analysis.

Figure 2:
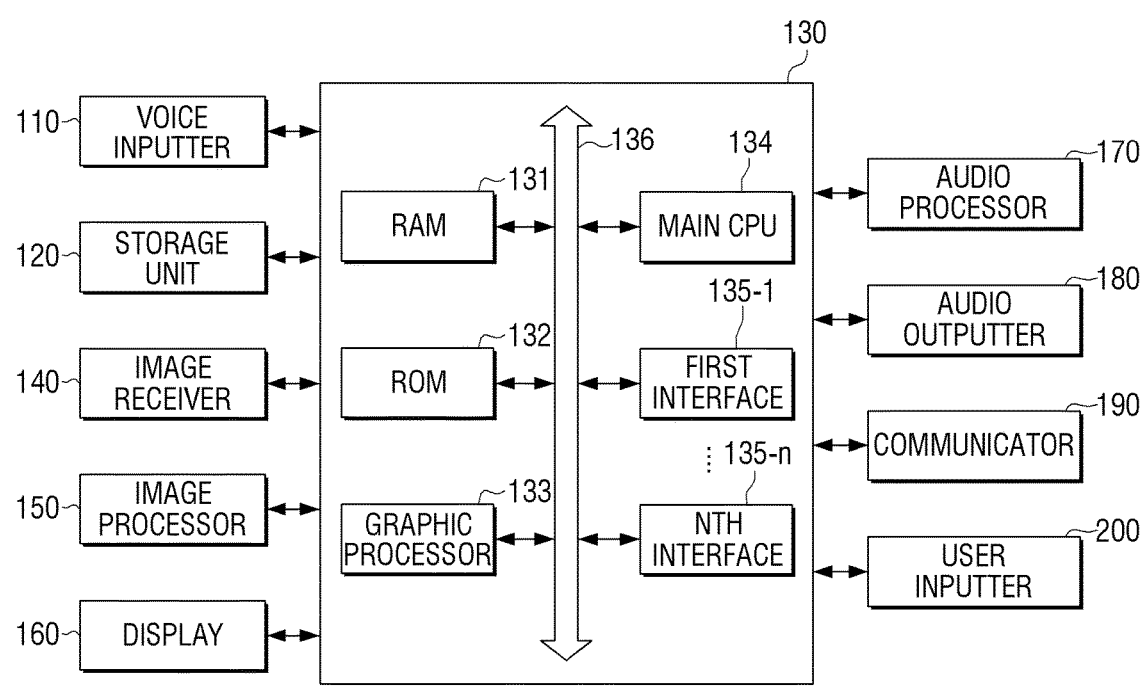
FIG. 2 is a block diagram illustrating a detailed configuration of an electronic apparatus according to an exemplary embodiment.

The electronic apparatus 100 may further include more elements as illustrated in FIG. 2. Specifically, the electronic apparatus 100 may include the voice inputter 110, the storage unit 120, the controller 130, an image receiver 140, an image processor 150, a display 160, an audio processor 170, an audio outputter 180, a communicator 190 and a user inputter 200. FIG. 2 is a view illustrating various elements synthetically, as an example of an electronic apparatus 100 equipped with various functions such as a user registration function, a user voice recognition function, a communication function, a video playback function, a display function and the like. Thus, according to an exemplary embodiment, some of the elements illustrated in FIG. 2 may be omitted or changed, and other elements may be added.

The voice inputter 110 is an element for inputting a user voice. The voice inputter 110 may include a microphone (not illustrated) and input a user voice through the microphone. The microphone may be included in the electronic apparatus 100. Also, the microphone may be included in an external apparatus such as a remote controller for controlling the electronic apparatus 100. In this moment, the remote controller may receive a user voice through the microphone and transmit the user voice to the voice inputter 110.

Not only a user voice, but also a sound such as a noise or an echo of a place where a user voice is uttered may be inputted through the voice inputter 110.

The storage unit 120 may store various kinds of information, such as a voice print feature model and a voice print environment model. Meanwhile, the storage unit 120 may store various software modules, data and the like for driving the electronic apparatus 100. To be specific, as illustrated in FIG. 3, the storage unit 120 may store a software module, such as a voice distinction module 121, a voice section detection module 122, a voice print feature detection module 123, a user registration module 124, a similarity extraction module 125, an utterance environment information extraction module 126, a normalization parameter extraction module 127, a similarity normalization module 128, and a user recognition module 129. However, various software modules illustrated in FIG. 3 are mere examples, and the storage unit 120 may include modules combining a plurality of functions, and a module may be omitted based on the features of the electronic apparatus 100.

The voice distinction module 121 may determine whether a voice input through the voice inputter 110 is a user voice. The voice section detection module 122 may detect a section determined by a user voice among input sounds through the voice inputter 110.

That is, if a sound is inputted through the voice inputter 110, it is determined whether a sound is a user voice through the voice determination module 121 and the voice section detection module 122, and a section determined as the user voice may be detected.

The voice print feature detection module 123 may detect a voice print feature of a user input. That is, the voice print feature detection module 123 may analyze a frequency distribution of a section determined as a user voice by the voice section detection module 122, and the voice print of a user may be detected.

The user registration module 124 may store a detected voice print feature as a new user's voice print feature if it is determined that the detected voice print feature is a voice print feature which is not stored.

For example, the user registration module 124 may match and store the detected voice print feature with a unique identifier for a user. Also, if a name or a nickname of a user who uttered a user voice is inputted by a user, the user registration module 124 may match and store a detected voice print feature with the inputted user's name or a nickname.

A user's name or a nickname may be registered using a user voice input or a text input. For example, a user interface (UI) for setting a user's name or a nickname is displayed at the electronic apparatus 100, and the user utters a word which is used as a name or a nickname at or within a predetermined time, so that the user's name or nickname may be registered.

If the user's name or nickname is registered by a text input, a user may write a text on the electronic apparatus 100 or a touch pad including an external control apparatus (for example, a remote controller) using the user's finger or a separately equipped pen or other means of text input. If the electronic apparatus 100 or an external control apparatus is equipped with a keyboard inputted by a touch or a button in the shape of a keyboard, the user may type text through a touch or a button in the shape of a keyboard.

The similarity extraction module 125 may compare a detected voice print feature from the voice print feature detection module 123 and may extract a similarity.

Specifically, the similarity extraction module 125 may detect a digitized similarity value according to a degree of a similarity between a detected voice print feature and a pre-stored voice print feature model.

For example, if it is determined that a detected voice print feature is similar with data stored as user A's voice print feature by about 80%, it may be determined that the detected voice print feature may have a similarity value of 80% with respect to user A's voice print feature. If it is determined that the electronic apparatus 100 has a similarity value not less than a threshold value (for example, 0.9 or 90%), an input voice is determined as a voice of user A, and an execution mode of the electronic apparatus 100 may be changed to a predetermined voice recognition mode belonging to user A.

However, as described above, the determined similarity value may be lower than the threshold value, and thus, the electronic apparatus 100 may perform normalization with respect to the similarity value as described below. A specific normalization method with respect to a threshold value will be explained below.

As described above, the similarity extraction value 125 may set a range of a similarity value not less than 0 and not more than 1, so that it may digitize that if the similarity value is 0, the similarity value is low, and if the similarity value is 1, the similarity value is high. However, this is a mere example and a standard range may be changed from 0 to 100 and the like.

The utterance environment information extraction module 126 may extract utterance environment information from a stored utterance environment model. In other words, the utterance environment model includes information regarding various noises or reverberation which may occur in the surroundings while using the electronic apparatus 100. Accordingly, the utterance environment information extraction module 126 may extract information regarding an utterance environment at the time when a user's voice is uttered.

Specifically, the utterance environment information extraction module 126 may extract utterance environment information within a range of a predetermined time around the time when the user voice is input, or may extract the updated utterance environment information, just before the user voice is input.

The normalization parameter extraction module 127 is an element for extracting a normalized parameter. In other words, the normalization parameter extraction module 127 may extract a normalization parameter from the utterance environment information extracted through the utterance environment information extraction module 126.

The normalization parameter is a parameter for normalizing a similarity value extracted through the similarity extraction module 125. In other words, the similarity value extracted through the similarity extraction module 125 is a value extracted regarding a voice print feature which analyzes a user voice including a noise or a reverberation prevalent at the time when the user voice is input. Accordingly, the normalization parameter extraction module 127 may extract a normalization parameter regarding utterance environment information extracted by the utterance environment information extraction module 126 to normalize the similarity value.

The similarity normalization module 128 may normalize a similarity value extracted through the similarity extraction module 125 using an extracted normalization parameter extracted by the normalization parameter extraction module 127.

In other words, to correctly recognize a user via a user voice input through the voice inputter 110, the similarity normalization module 128 performs normalization with respect to a similarity value.

For example, if the electronic apparatus 100 is used in a living room in a house, and a vacuum cleaner is operated in the living room, a noise of 75 dB is produced. The electronic apparatus 100 may store information regarding an utterance environment when the vacuum is used, in an utterance environment model.

If a user voice is input through the voice inputter 110 while the vacuum cleaner is being operated, as described above, a voice print feature of a user voice where the noise of the vacuum cleaner is included may be detected through the voice print feature detection module 123. Also, through the utterance environment information extraction module 126, pre-stored utterance environment information, regarding a situation in which a vacuum cleaner is used during user voice input, may be extracted.

If it is determined that a detected voice print feature is 80% similar to stored data belonging to user A, according to an exemplary embodiment, the similarity extraction module 125 may determine that the detected voice print feature has a similarity value of 0.8 with respect to a voice print feature of user A.

The normalization parameter extraction module 127 may extract a normalization parameter based on the utterance environment information extracted through the utterance environment information extraction module 126. Also, the similarity normalization module 128 may normalize the similarity value of 0.8 using the extracted normalization parameter.

The user recognition module 129 may recognize a user who uttered a user voice based on a normalized similarity value. In other words, if it is determined that a voice print feature of a user voice input to the similarity normalization module 128 has a similarity value of 0.8 with respect to user A, and following the similarity normalization, the voice print feature of the user input has a similarity value of 0.93 with respect to user A, the user recognition module 129 may recognize the inputted user voice as a voice of user A.

Meanwhile, if a voice print feature of a user voice input to the similarity normalization module 128 is determined to have a similarity value of 0.8 with respect to user A, a similarity value of 0.7 with respect to user B, and a similarity value of 0.68 with respect to user C, and the plurality of similarity values are normalized by the similarity normalization module 128, so that the input user voice has a similarity value of 0.93 with respect to user A, the user recognition module 129 may recognize the input user voice as a voice of user A.

FIG. 2 illustrates the image receiver 140 which may receive image data through various sources. For example, the image receiver 140 may receive broadcasting data through an external broadcasting company, may receive image data in real time from an external server, and may receive image data stored in the internal storage unit 120.

The image processor 150 may perform processing on the image data received from the image receiver 140. The image processor 150 may perform various types of image processing, such as decoding, scaling, noise filtering, frame rate converting, a resolution converting regarding image data and the like.

The display 160 may display various images and user interfaces (UIs). In other words, the display 160 may display at least one of a video frame where image data received from the image receiver 140 and processed by the image processor 150, and various screens generated by the graphic processor 133.

The display 160 may display various UIs such as a UI for registering a user, a UI for recognizing a user who utters a user voice, UI for informing the user that utterance environment information is updated and the like. A detailed example of a UI where the display 160 may display information will be explained later in more detail.

The audio processor 170 may process audio data. The audio processor 170 may perform various types of processing, such as decoding, amplifying, noise filtering regarding audio data and the like. Audio data processed by the audio processor 170 may be output to the audio outputter 180.

The audio outputter 180 is configured to output not only audio data processed by the audio processor 170, but also various notification sounds or voice messages. At this moment, the audio outputter 180 may be realized as a speaker, but is not limited thereto, and it also may be realized as an audio terminal.

The communicator 190 may perform communication with various types of external apparatuses and external servers according to various types of communication methods. The communicator 190 may include various communication modules, such as a Universal Serial Bus (USB) module, a Wi-Fi module, a Bluetooth module, a Near Field Communication (NFC) module and the like. The Wi-Fi module, the Bluetooth module, and the NFC module perform a communication using a Wi-Fi method, a Bluetooth method, and an NFC method, respectively. The NFC module represents a module which is operated with an NFC method which uses 13.56 MHz band among various RF-ID frequency bands such as 135 kHz, 13.56 MHz, 433 MHz, 860~960 MHz, 2.45 GHz and the like. If the Wi-Fi module or the Bluetooth module is used, various kinds of connection information such as a subsystem identification (SSID), a session key and the like is transmitted and received first, and after establishing communication, various kinds of information may be transmitted and received.

Meanwhile, if an input user voice is analyzed by an external server, and a voice print feature is extracted, the communicator 190 may transmit the input user voice to the external server and receive the extracted voice print feature from the external server. Also, voice data where the input user voice is converted may be transmitted to the external server through the communicator 190. If a voice print feature model or an utterance environment model is stored in an external server or an external storage apparatus, different from the internal storage unit 120, the communicator 190 may receive information according based on necessity from the external server or the external storage apparatus.

The user inputter 200 may receive a user command for controlling an overall operation of the electronic apparatus 100. At this moment, the user inputter 200 may be realized as a remote controller including 4-direction key of up, down, left and right sides, and a confirmation key, but is not limited thereto and may be realized as a variety of different input apparatuses such as a touch screen, a mouse, a pointing device, a smart phone, a cell phone, and the like.

The user inputter 200 may further input text data. In other words, the user inputter 200 may include a touch pad, a touch keyboard, a key keyboard and the like so that a text data, to input user name, identifier, and the like may be input.

If the user inputter 200 is realized as a remote controller, the remote controller may include an input button for receiving a voice. The user may press an input button of the remote controller and then, a user voice may be uttered.

The controller 130 may control the overall operation of the electronic apparatus 100. Specifically, the controller 130 may analyze a user voice input through the voice inputter 110 and then, extract a voice print feature. The controller 130 may further compare an extracted voice print feature with a voice print feature model stored in the storage unit 120, and recognize the user who uttered the input user voice.

Especially, if an input user voice is distorted by a background noise or a reverberation, the controller 130 may extract utterance environment information at the time when the user voice is input, and revise a comparison result of the extracted voice print feature and the pre-stored voice print feature model according to the extracted utterance environment information so that a user may be recognized.

Specifically, the controller 130 may compare a voice print feature of an input user voice and a voice print feature model stored in the storage unit 120, and measure a similarity between the voice print feature of the user voice input and each voice print feature model of the plurality of users stored in the storage unit 120. The controller 130 may revise the similarity based on the extracted utterance environment information, and recognize a user corresponding to the revised similarity.

The controller 130 may extract a normalization parameter at a time when a user voice is input, from a stored utterance environment model. The controller 130 may further normalize a similarity using an extracted normalization parameter and recognize the user.

If a user who utters a user voice is recognized by the method described above, the controller 130 may change an execution mode of the electronic apparatus 100 to a predetermined voice recognition mode based on the recognized user.

If a user registration is performed with a user voice, the controller 130 may use an utterance environment model, according to an exemplary embodiment. Specifically, if a user voice for a user registration is input through the voice inputter 110, the controller 130 may analyze the input user voice, detect a voice print feature, revise a detected voice print feature according to the utterance environment information stored in the storage unit 120, and perform a user registration according to the revised result.

The controller 130 may include a random-access memory (RAM) 131, a read-only memory (ROM) 132, a graphic processor 133, a main central processing unit (CPU) 134, the first to the nth interface 135-1~135-n, and a bus 136. The random-access memory (RAM) 131, the read-only memory (ROM) 132, the graphic processor 133, the main central processing unit (CPU) 134, the first to the nth interface 135-1~135-n and the like may be connected to each other through the bus 136.

A command set for system booting and the like may be stored in the ROM 132. If a command to turn on the electronic device 100 is input and a power is provided, the main CPU 134 may copy an operating system (O/S) stored in a storage unit 120, in the RAM 131, according to a command stored in the ROM 132, and execute the O/S so that a system is booted. If the booting is completed, the main CPU 134 may copy various application programs stored in the storage unit 120, to the RAM 131, and execute the application programs copied in the RAM 131 so that various operations are performed, according to an exemplary embodiment.

The graphic processor 133 may generate a screen including various objects such as an icon, an image, a text and the like using a calculation unit (not illustrated) and a rendering unit (not illustrated). The calculation unit calculates an attribute value such as a coordinate value, a shape, a size, a color and the like where each object is displayed according to a layout of a screen using a control command received from the user inputter 200. The rendering unit generates a screen of various layouts including the object based on the attribute value calculated by the calculation unit. The screen generated by the rendering unit is displayed in a display area of the display 160. Various UIs such as a UI for registering a user, a UI for updating an utterance environment model and the like may be generated, according to an exemplary embodiment.

The main CPU 134 accesses to the storage unit 120, and performs booting using an O/S stored in the storage unit 120. The main CPU 134 performs various operations using various programs, contents, data and the like stored in the storage unit 120.

The first to the nth interfaces 135-1~135-n are connected with various elements described above. One of the interfaces may be a network interface which is connected with an external apparatus through a network.

A user is able to use an electronic apparatus 100 which is able to recognize a user who utters a user voice regardless of background noise when the user voice is uttered or a reverberation which is accompanying with the user voice in a place where the user voice is uttered, by the electronic apparatus 100 as described above.

Figure 4A:
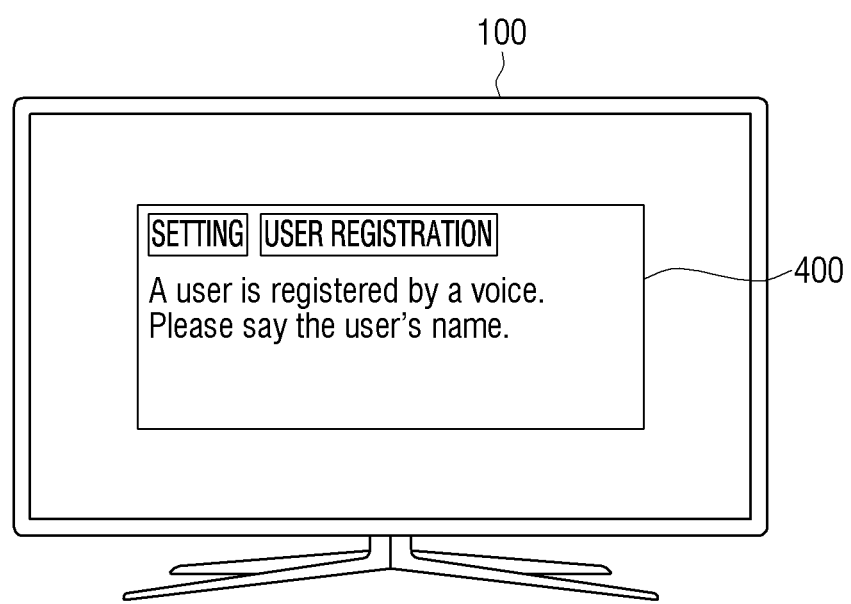
FIGS. 4A to 4C are views illustrating a method of registering a user using a user voice according to an exemplary embodiment.
Figure 4B:
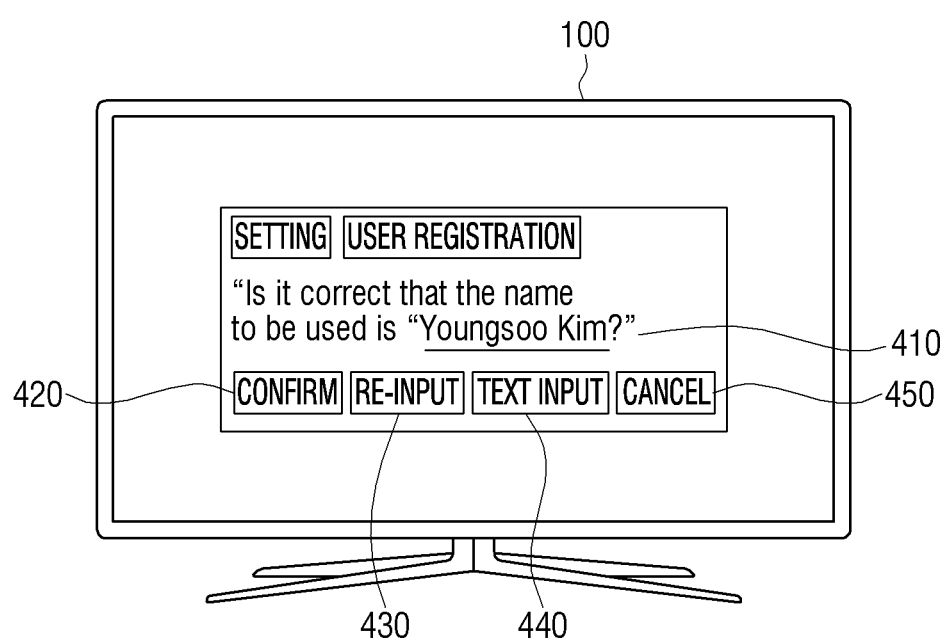
Figure 4C:
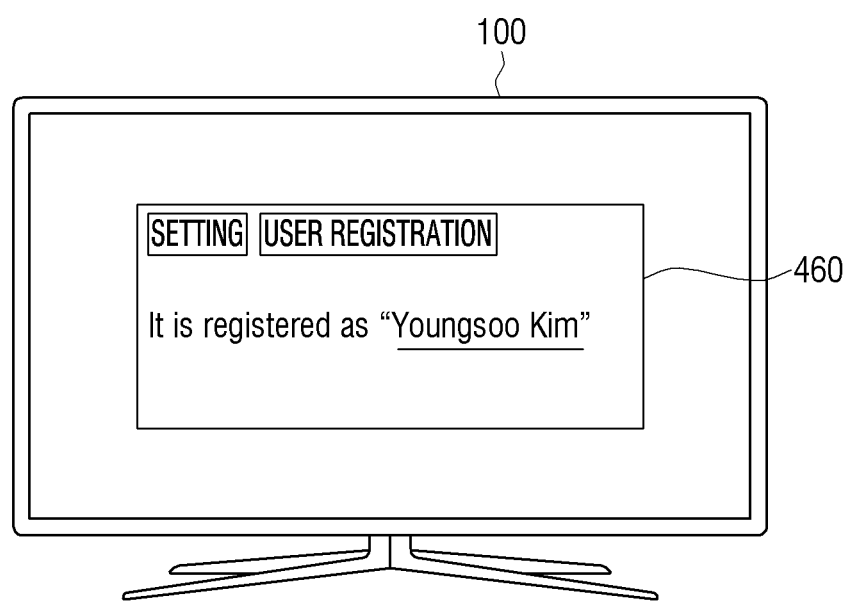

FIGS. 4A to 4C are views illustrating a screen for registering a user who utters a user voice, according to an exemplary embodiment. The user may input a name or an identifier to use while using the electronic apparatus 100. The electronic apparatus 100 may recognize a user voice and perform a user registration. However, if a background noise or a reverberation is input along with an uttered user voice, the electronic apparatus 100 may revise an input user voice and perform a user registration.

FIG. 4A is a view illustrating an electronic apparatus 100 displaying a beginning screen 400 for a user registration through the display 160. In other words, the electronic apparatus 100 may display words of guidance such as "a user is registered by a voice. Please say a user name."

FIG. 4B is a view illustrating the electronic apparatus 100 displaying a screen for confirming a voice recognition result according to an exemplary embodiment.

For example, in the screen 400 as illustrated in FIG. 4A, if a voice, 'Youngsoo Kim,' is input for user registration, the electronic apparatus 100 may analyze the input voice and convert the voice to text data. The electronic apparatus 100 may display the converted text data to determine whether a recognition result is identical to the voice that the user input.

If a background noise or a reverberation sound is input at the time when a voice for user registration is input, the electronic apparatus 100 may revise the analyzed user voice and extract a voice recognition result.

Specifically, the electronic apparatus 100 may analyze a user voice, and detect a voice print feature according to a frequency distribution of a user voice. The electronic apparatus 100 may then extract utterance environment information at a time when the user voice is input from a pre-stored environment model. The electronic apparatus 100 may extract utterance environment information in a predetermined range of time around the time when the user voice is input, or may extract utterance environment information which is updated last, just before the user voice is input. The electronic apparatus 100 may use extracted utterance environment information, revise a voice print feature and extract a voice recognition result. The electronic apparatus 100 may convert the voice recognition result to text data and display the text data on the screen 400.

To be specific, the electronic apparatus 100 may display a phrase such as "is it correct that the name to be used is "Youngsoo Kim"?" 410 through the display 160. A screen to confirm a voice recognition result may display a selection menu such as a "confirm 420," a "re-input 430," a "text input 440" and a "cancel 450" button.

In other words, if a voice recognition result which the electronic apparatus 100 displays is identical to an uttered voice, the user may select the confirm 420 menu button so that a user registration is completed.

If a voice recognition result which the electronic apparatus 100 displays is not identical to an uttered voice, the user may select the re-input 430 menu button so that a voice utterance for a user registration may be re-entered. In other words, if the re-input 430 menu button is selected, the electronic apparatus 100 may display the beginning screen 400 for a user registration again as illustrated in FIG. 4A.

If a voice recognition result which the electronic apparatus 100 displays is not identical to an uttered voice, or a voice recognition of the electronic apparatus 100 is not available, a user may register a user using the text input 440 menu button. In this case, the electronic apparatus 100 may display a different UI to register a user name or an identifier using text input. If the user wants to cancel a user registration, the user may select the cancel 450 menu button.

FIG. 4C is a view illustrating a user registration result screen 460 according to an exemplary embodiment. As illustrated in FIG. 4B, if a screen to confirm a voice recognition result is displayed and a command to confirm that the voice recognition result is correct is input from a user, the electronic apparatus 100 may complete a user registration. As illustrated in 4C, a UI may be displayed so that the user may verify a user registration result.

If a user registration regarding a plurality of users is completed by the above-described method and a user voice is input, the electronic apparatus 100 may recognize a user.

Especially, if a sound is input through the voice inputter 110, the electronic apparatus 100 may determine whether the input sound is a user voice. The electronic apparatus 100 may detect a section which is determined as a user voice among input sounds.

The electronic apparatus 100 may then detect a voice print feature of the user voice. In other words, the electronic apparatus 100 may analyze a frequency distribution of a section which is determined as the user voice and detect a voice print of the user.

The electronic apparatus 100 may compare a detected voice print feature with stored voice print feature models and extract a similarity. To be specific, the electronic apparatus may detect a similarity value which digitizes a similarity between a detected voice print feature and stored voice print feature models.

For example, if it is determined that a detected voice print feature is similar with data stored as a voice print feature of a user registered as "Youngsoo Kim," it may be determined that the detected voice print feature has a similarity value of 80% with respect to "Youngsoo Kim's" stored voice feature, according to an exemplary embodiment. If it is determined that an input user voice has a similarity value which is not less than a threshold value (for example, 0.9), the electronic apparatus 100 may determine that the input user voice is "Youngsoo Kim's" voice and change the execution mode of the electronic apparatus 100 to a predetermined voice recognition mode belonging to "Youngsoo Kim."

However, as described in the above exemplary embodiment, the determined similarity value is less than the threshold value, and thus, the electronic apparatus may perform a normalization regarding a similarity value as explained in detail below.

To perform normalization, the electronic apparatus 100 may extract utterance environment information from a pre-stored utterance environment model. In other words, the electronic apparatus may store information regarding various noises or reverberations which may be accompany the user voice input while using the apparatus. Accordingly, the electronic apparatus 100 may extract information regarding an utterance environment at the time when a user voice is uttered as an utterance environment model.

Specifically, the electronic apparatus 100 may extract utterance environment information in a predetermined range of time around a time when the user voice is input, or may extract utterance environment information which is updated last, just before the user voice is input.

Also, the electronic apparatus 100 may extract a normalization parameter from the extracted utterance environment information. The normalization parameter is a parameter to normalize an extracted similarity value. In other words, the extracted similarity value is an extracted value regarding a voice print feature which is used to analyze a user voice including noise or reverberation at a time when the user voice is input. Accordingly, the electronic apparatus 100 may extract a normalization parameter regarding extracted utterance environment information to normalize a similarity value.

The electronic apparatus 100 may normalize an extracted similarity value using an extracted normalization parameter. In other words, to correctly recognize a user corresponding to the user voice input through the voice inputter 110, the electronic apparatus 100 may perform a normalization of the similarity value.

The electronic apparatus 100 may then recognize a user who utters a user voice according to a normalized similarity value. In other words, if it is determined that a voice print feature of an input user voice has a similarity value of 0.8 with respect to "Youngsoo Kim," and after normalization the user voice, based on the normalized parameter, has a similarity of 0.93 with respect to "Youngsoo Kim," the electronic apparatus 100 may recognize the input user voice as the voice of "Youngsoo Kim."

If it is determined that a voice feature of an input user voice has a similarity value of 0.8 with respect to "Youngsoo Kim," a similarity value of 0.7 with respect to "Cheolsoo Lee" and a similarity value of 0.68 with respect to "Sujin Park," and a plurality of similarity values are normalized by a detected normalization parameter so that the voice print feature of the inputted user voice is normalized to have similarity value of 0.93 with respect to "Youngsoo Kim," the electronic apparatus 100 may recognize the input user voice as a voice of "Youngsoo Kim", according to an exemplary embodiment.

An utterance environment model may be pre-stored as a default value in the electronic apparatus 100, or may be updated. In other words, the electronic apparatus 100 may analyze a sound input during a predetermined period or a user setting and update the utterance environment model.

Specifically, the electronic apparatus 100 may store a noise, other than a user voice, input from a place where the apparatus is used, as data. Also, the electronic apparatus 100 may detect a degree of distortion of a user voice by reverberation at a place where the apparatus is used, and store information regarding the reverberation as data.

Figure 5:
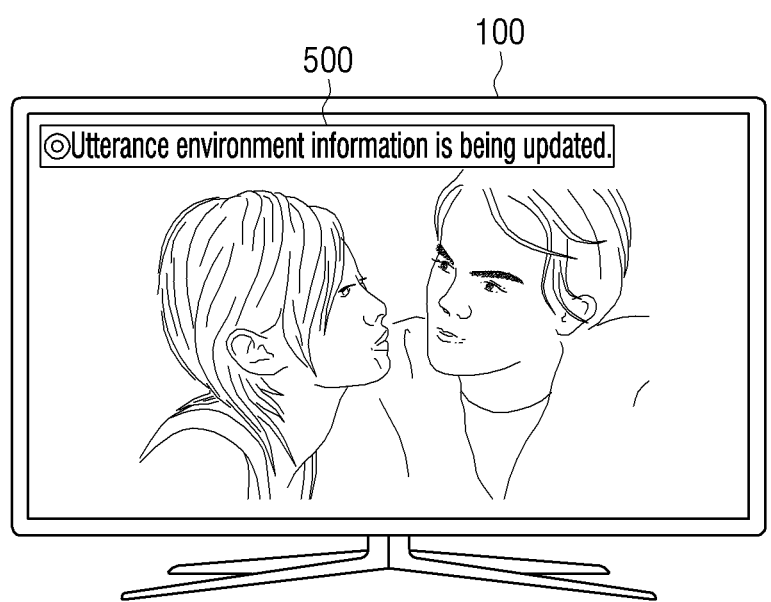
FIG. 5 is a view illustrating a screen of an electronic apparatus which updates utterance environment information according to an exemplary embodiment.

An update of the utterance environment model may be performed during a predetermined time period. In other words, even if a separate user command is not input, a noise and a reverberation of a place where the electronic apparatus 100 is used may be collected at predetermined time periods so that an utterance environment model may be updated. To notify an update of an utterance environment model, the electronic apparatus 100 may display a notification such as "utterance environment information is being updated" 500 in a first region of the display 160 as illustrated in FIG. 5.

Figure 6:
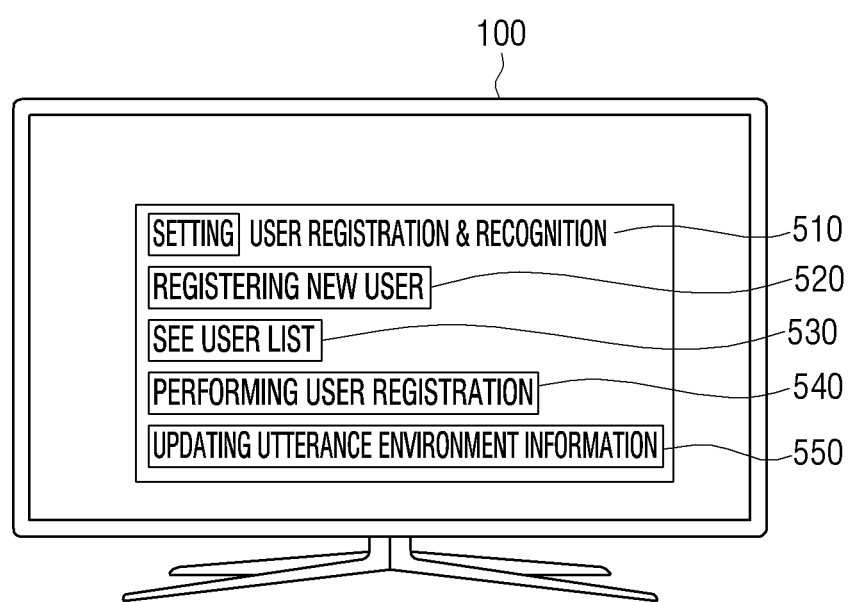
FIG. 6 is a view illustrating a description screen regarding a user registration and recognition using a user voice according to an exemplary embodiment.

FIG. 6 is a view illustrating a setting screen 510 regarding a user registration and a user recognition according to an exemplary embodiment. A user may use a menu such as "registering new user" 520, "see user list" 530, "performing user registration" 540 and "updating utterance environment information" 550.

To register a user other than a pre-registered user, the user may use "registering new user" 520 menu button. Also, to see a pre-registered user list, the user may use "see user list" 530 menu button.

If a "performing user registration" 540 menu button is selected, and a user voice is uttered, the electronic apparatus 100 may analyze a user voice through the process described above, and recognize a pre-registered user.

If an "updating utterance environment information" 550 menu button is selected, updating of an utterance environment model may be performed regardless of a predetermined time period of updating the utterance environment model described above. Specifically, if the "updating utterance environment information" 550 menu is selected, the electronic apparatus 100 may collect a noise and a reverberation of a place where the electronic apparatus is used, analyze collected sound, and update the utterance environment model.

Figure 7A:
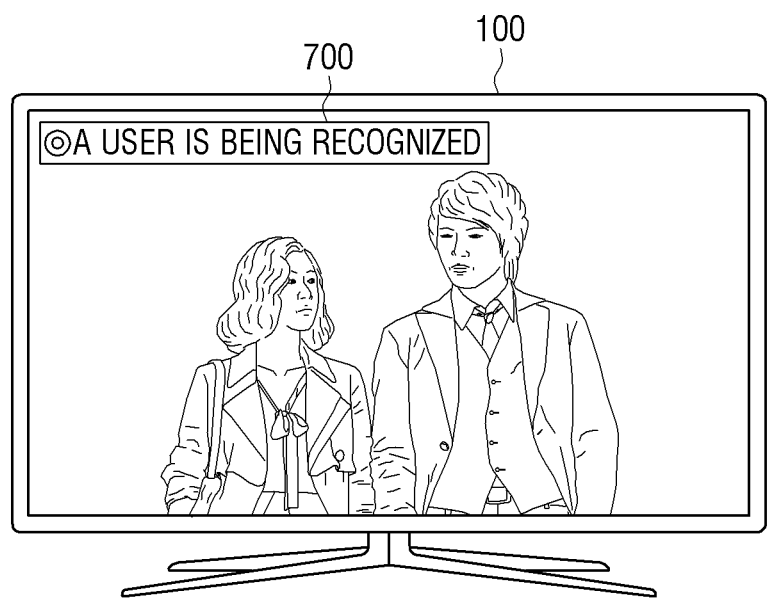
FIGS. 7A and 7B are views illustrating a method of executing a voice recognition mode for a pre-registered user according to an exemplary embodiment.

As described above, while a voice print feature of an input user voice is normalized by utterance environment information so that a user is recognized, the electronic apparatus 100 may display a notification UI 700 such as "a user is being recognized" as illustrated in FIG. 7A. Especially, the electronic apparatus 100 may display the notification UI, such as "a user is being recognized" 700 on a corner of the display 160, so that the user watching an image content displayed through the display 160 is not disturbed.

Figure 7B:
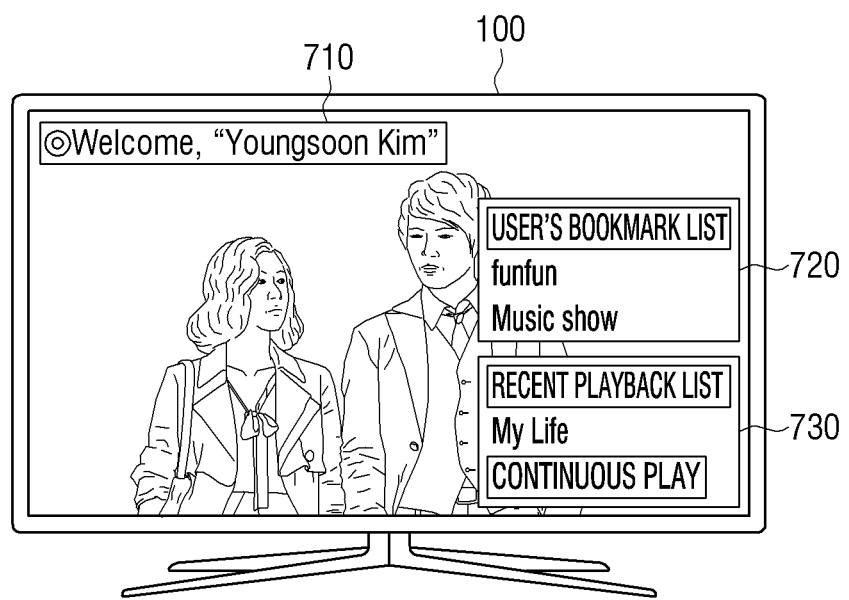

If an user recognition is completed, the electronic apparatus 100 may display a phrase such as "welcome, "Youngsoo Kim"" 710 so that a user recognition result may be displayed, as shown in FIG. 7B.

The electronic apparatus 100 may further display a user's bookmark list 720, recent playback list 730 and the like on a random region in the display 160, as shown in FIG. 7B. Also, the displayed user's bookmark list 720 and the recent playback list 730 may disappeared from a screen after a predetermined time lapses even if a separate user command is not input.

The electronic apparatus 100 may recognize a user voice, provide set information according to a user, and recommend additional information corresponding to the needs of each user.

FIG. 8 is a flowchart illustrating a control method of performing voice recognition using the electronic apparatus 100 according to an exemplary embodiment. First, the electronic apparatus 100 inputs a user voice (S800). Then, the electronic apparatus 100 extracts utterance environment information at a time when the user voice is input using a pre-stored utterance environment model (S810).

The utterance environment model includes information regarding various noises or reverberations which may occur while the electronic apparatus 100 is being used. Accordingly, the electronic apparatus 100 may extract information regarding an utterance environment of a time when a user voice is uttered.

To be specific, the electronic apparatus 100 may extract utterance environment information in a predetermined range of time around a time when the user voice is input, or may extract utterance environment information which is updated last, just before the user voice is input.

The electronic apparatus 100 extracts a voice print feature of an input user voice (S820) and compares a voice print feature of the input user voice with pre-stored voice print feature model (S830). Specifically, the electronic apparatus 100 compares a voice feature of an input user voice with pre-stored voice print feature model, and measure a similarity with pre-stored voice print feature model for each of a plurality of users.

The electronic apparatus 100 revises the comparison result based to the extracted utterance environment information and recognizes a user (S840). In other words, the electronic apparatus 100 may extract a normalization parameter, which is utterance environment information at a time when a user voice is input, from a pre-stored utterance environment model, and the electronic apparatus 100 may normalize a similarity using an extracted normalization parameter and recognize a user.

By the electronic apparatus 100 described above, a user is able to use the electronic apparatus o recognize a user who utters a user voice regardless of background noise occurring when the user voice is uttered or reverberation prevalent at a place where the user voice is uttered.

The controlling method of the electronic apparatus according to various exemplary embodiment described above may be decoded as software and stored in a non-transitory computer readable medium.

The non-transitory readable medium means a medium which stores a data semi-permanently and is readable by an apparatus, not a media which stores a data for a short period such as a register, a cache, a memory and so on. Specifically, the above-described various types of applications or programs may be stored in the non-transitory readable medium such as be a compact disc (CD), a digital versatile disk (DVD), a hard disk, a Blu-ray disk, a universal serial bus (USB), a memory card, and a read only memory (ROM).

Exemplary embodiments were illustrated and explained above, but the embodiments are not limited to the described exemplary embodiments. Also, the description of the embodiments is intended to be illustrative, and not to limit the scope of the claims, and it would be appreciated by those skilled in the art that changes may be made to the embodiments without departing from the principles and spirit of the disclosure, the scope of which is defined in the appended claims.

What is claimed is:

1. An electronic apparatus, comprising:
a voice input unit configured to receive a user voice;
a storage unit configured to store a plurality of voice print feature models representing a plurality of user voices and a plurality of utterance environment models representing a plurality of environmental disturbances; and
a controller, in response to the user voice being input through the voice input unit, configured to:
calculate a plurality of similarities between a voice print feature of the user voice and a plurality of voice print features of the plurality of voice print feature models stored in the storage unit without using, in calculating the plurality of similarities, an utterance environment model corresponding to a place where the user voice is input,
determine whether there is a similarity equal to or greater than a preset value, from among the plurality of similarities,
in response to determining that the similarity equal to or greater than the preset value exists, recognize a user based on a voice print feature model corresponding to the similarity equal to or greater than the preset value, from among the plurality of voice print feature models, and
in response to determining that the similarity equal to or greater than the preset value does not exist, revise the plurality of similarities using the utterance environment model corresponding to the place where the user voice is input, from among the plurality of utterance environment models, and recognize the user using the revised plurality of similarities.

2. The electronic apparatus as claimed in claim 1, wherein the controller is further configured to:
extract a normalization parameter comprising the utterance environment model corresponding to the place where the user voice is input, from among the plurality of utterance environment models,
normalize the plurality of similarities using the normalization parameter, and
recognize the user corresponding to the input user voice based on the normalized similarities.

3. The electronic apparatus as claimed in claim 1, wherein the utterance environment model comprises at least one of a noise corresponding to the place where the user voice is uttered and information regarding a reverberation.

4. The electronic apparatus as claimed in claim 1, wherein the controller is further configured to analyze an utterance environment of the electronic apparatus after a predetermined time period and update the utterance environment model.

5. The electronic apparatus as claimed in claim 1, wherein the controller, in response to the user voice being input for user registration, is further configured to:
analyze the user voice,
extract the voice print feature corresponding to the user voice,
revise the extracted voice print feature based on the utterance environment model corresponding to the place where the user voice is input, and
perform the user registration based on the revised voice print feature.

6. The electronic apparatus as claimed in claim 1, wherein the controller, in response to the user being recognized, is further configured to change an execution mode of the electronic apparatus to a predetermined voice recognition mode based on the recognized user.

7. A method of controlling an electronic apparatus comprising a microphone and a processor, the method comprising:
  receiving a user voice input by the microphone;
  in response to the user voice being input through the microphone, calculating, by the processor, a plurality of similarities between a voice print feature of the user voice and a plurality of voice print features of a plurality of voice print feature models representing a plurality of user voices without using, in calculating the plurality of similarities, an utterance environment model corresponding to a place where the user voice is input;
  determining, by the processor, whether there is a similarity equal to or greater than a preset value, from among the plurality of similarities;
  in response to determining that the similarity equal to or greater than the preset value exists, recognizing a user, by the processor, based on a voice print feature model corresponding to the similarity equal to or greater than the preset value, from among the plurality of voice print feature models; and
  in response to determining that the similarity equal to or greater than the preset value does not exist, revising, by the processor, the plurality of similarities using the utterance environment model corresponding to the place where the user voice is input, from among a plurality of utterance environment models representing a plurality of environmental disturbances, and recognizing the user, by the processor, based on the revised plurality of similarities.

8. The method as claimed in claim 7, wherein the revising comprises:
  extracting a normalization parameter comprising utterance environment information corresponding to the place where the user voice is input, from among the plurality of utterance environment models; and
  normalizing the plurality of similarities using the normalization parameter, and
  wherein the recognizing comprises recognizing the user corresponding to the input user voice based on the normalized similarities.

9. The method as claimed in claim 7, wherein the utterance environment model comprises at least one of a noise corresponding to the place where the user voice is uttered and information regarding a reverberation.

10. The method as claimed in claim 7, the method further comprising:
  analyzing an utterance environment of the electronic apparatus after a predetermined time period and updating the utterance environment model.

11. The method as claimed in claim 7, the further comprising:
  in response to the user voice being input for user registration, analyzing the user voice, extracting the voice print feature corresponding to the user voice, revising the extracted voice print feature based on the utterance environment model corresponding to the place where the user voice is input, and performing the user registration based on the revised voice print feature.

12. The method as claimed in claim 7, the method further comprising:
  in response to the user being recognized, changing an execution mode of the electronic apparatus to a predetermined voice recognition mode based on the recognized user.

13. An electronic apparatus, comprising:
  a microphone configured to receive a user voice;
  a processor, in response to the user voice being input through the microphone, configured to:
    extract a voice print feature corresponding to the user voice,
    extract surrounding noise information incorporated in the received user voice using a surrounding noise information model stored in a storage unit,
    calculate a plurality of similarities between the voice print feature of the user voice and a plurality of voice print features of a plurality of voice print feature models which represent a plurality of users and are stored in the storage unit, without using, in calculating the plurality of similarities, the surrounding noise information,
    determine whether there is a similarity equal to or greater than a preset value, from among the plurality of similarities,
    in response to determining that the similarity equal to or greater than the preset value exists, recognize a user based on a voice print feature model corresponding to the similarity equal to or greater than the preset value, from among the plurality of voice print feature models, and
    in response to determining that the similarity equal to or greater than the preset value does not exist, revise the plurality of similarities using the surrounding noise information, and recognize the user using the revised plurality of similarities.

* * * * *